United States Patent [19]

Koshimo

[11] Patent Number: 4,668,207
[45] Date of Patent: May 26, 1987

[54] DAMPER ASSEMBLY FOR A CLUTCH

[75] Inventor: Masahiko Koshimo, Osaka, Japan

[73] Assignee: Kabushiki Kaisha Daikin Seisakusho, Neyagawa, Japan

[21] Appl. No.: 757,457

[22] Filed: Jul. 22, 1985

[30] Foreign Application Priority Data

Jul. 31, 1984 [JP] Japan .............................. 59-162339

[51] Int. Cl.$^4$ .............................................. F16D 3/66
[52] U.S. Cl. .................................. 464/63; 192/106.2; 464/68
[58] Field of Search ................. 192/3.28, 70.17, 106.2; 464/63, 66, 67, 68, 64

[56] References Cited

U.S. PATENT DOCUMENTS 3,762,521 10/1973 Dotter ................................ 464/68 X
4,518,071 5/1985 Nozawa ............................. 464/68 X

FOREIGN PATENT DOCUMENTS 3240238 5/1983 Fed. Rep. of Germany ........ 464/67
2113803 8/1983 United Kingdom .................. 464/67

Primary Examiner—Daniel P. Stodola
Attorney, Agent, or Firm—Burns, Doane, Swecker & Mathis

[57] ABSTRACT

A damper assembly for a clutch has an annular cover assembly including a pair of first covers adapted to be connected to a torque input part and a pair of second covers; an annular first hub connected to the second cover; an annular second hub adapted to be connected to a torque output part; a wake first torsion spring mechanism connecting the first covers to the first hub; a strong second spring mechanism connecting the second covers to the second hub; and a stopper mechanism for preventing relative torsion between the first covers and the first hub when a torsion angle between the first covers and the first hub increases to predetermined values at positive and negative rotating directions; the stopper mechanism is so designed that the predetermined values of the torsion angle in the positive rotating direction and the negative rotating direction may be different from each other; and the second torsion spring mechanism includes a plurality of springs arranged in series with floting spacers therebetween.

6 Claims, 5 Drawing Figures

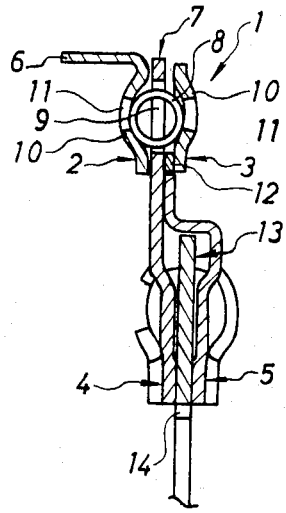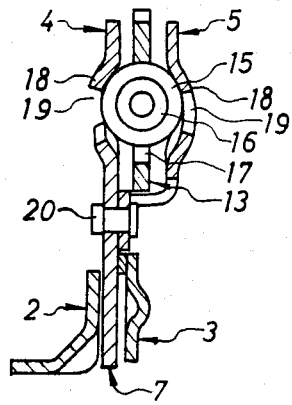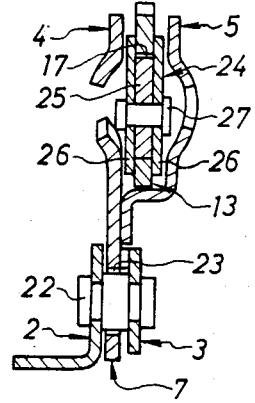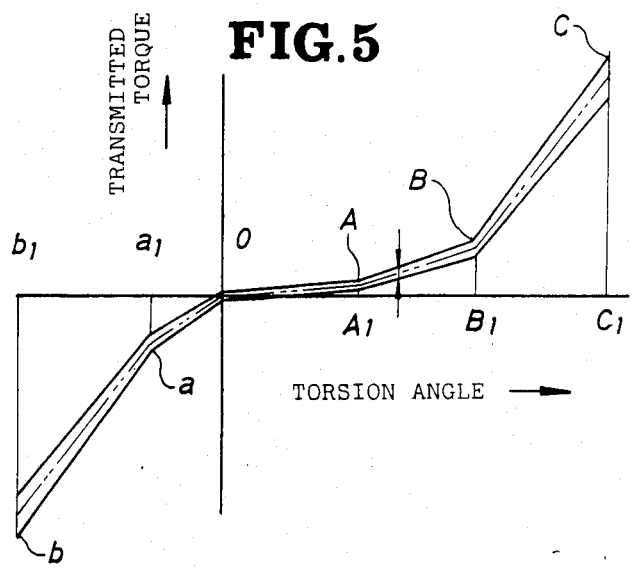

DAMPER ASSEMBLY FOR A CLUTCH

BACKGROUND OF THE INVENTION

The present invention relates to a damper assembly associated to a torque converter of an automobile or the like.

Generally, in a torque converter itself, there is essentially a power loss owing to slip in operation liquid, resulting in bad fuel consumption. Therefore, lock-up clutches or direct coupling mechanisms have already been assembled in some torque converters. In these torque converters of the direct coupling type, an output part of an engine is directly connected through said mechanism to a transmission in the direct coupling operation. Therefore, vibration and shock of a torque generated in the engine during speed-changing operation and accelerating operation are directly transmitted to the transmission, which causes gear attacking noises and other noises. Further, in some of the torque converters provided with the lock-up clutches or direct coupling mechanisms, drag of insufficient disengagement may be caused in a hydraulic clutch part in the transmission in the idling driving, which also results in the gear attacking noises owing to the torque vibration in the engine.

In order to absorb such vibration, it has been proposed to use dampers having large maximum torsion angles, as described in the Japanese Patent Application No. 57-10387 (U.S. Pat. No. 4,493,674; German Patent Application No. P 33 02 536. 3) and the Japanese Patent Application No. 56-174726 (U.S. patent application Ser. No. 436,804; German Patent Application No. P 32 40 238. 4). The structures of said Japanese Patent Application No. 57-10387 include a plurality of springs arranged in series with floating members such as equalizers and free spacers therebetween, and has twisting or torsion characteristics, which are symmetrical and same in positive and negative directions. However, as a result of tests in which those dampers were equipped in actual automobiles, it was proved that the conventional dampers can not sufficiently absorb the torque vibration, especially at an area of low torsional rigidity, i.e., during the idling driving.

SUMMARY OF THE INVENTION

Accordingly, it is an object of the invention to provide an improved damper assembly, which can prevent transmitting of torque vibration and rapid fluctuation to an output part. Specifically, the primary object of the present invention is to solve the disadvantage that the torque vibration effect can not be sufficiently high through the whole torsion areas including an idling driving area.

According to the invention, a damper assembly comprises an annular cover assembly including a pair of first covers adapted to be connected to a torque input part and a pair of second covers; an annular first hub connected to the second cover; an annular second hub adapted to be connected to a torque output part; a weak first torsion spring mechanism connecting the first covers to the first hub; a strong second spring mechanism connecting the second covers to the second hub; and a stopper mechanism for preventing relative torsion between the first covers and the first hub when a torsion angle between the first covers and the first hub increases to predetermined values at positive and negative rotating directions; and is characterized in that; said stopper mechanism is so designed that said predetermined values of the torsion angle in the positive rotating direction and the negative rotating direction may be different from each other; and said second torsion spring mechanism includes a plurality of springs arranged in series with floating spacers therebetween.

In the above structures, a torque transmitted from the input part to the first covers is transmitted through the first torsion spring mechanism to the first hub, and then, is transmitted through the second covers, second torsion spring mechanism and second hub to the output part.

In this operation, the first and second spring mechanisms are compressed by a force corresponding to the transmitted torque, so that the first covers twist relatively to the first hub and the second covers twist relatively to the second hub.

While the transmitted torque is small, e.g., in the positive torsion operation, the weak first spring is mainly compressed, whereby the torque vibration is absorbed. When the transmitted torque increases, the stopper mechanism prevents the compression of the first torsion spring mechanism as well as the relative twisting of the first covers and first hub, so that only the second torsion spring mechanism is compressed, whereby the torque vibration is absorbed.

When the second spring mechanism is compressed, a plurality of the springs arranged in series are compressed. Therefore, the compressed length of the whole second spring mechanism is long, and thus, a torsion angle corresponding to it is large.

The stopper mechanism set the torsion characteristics of the first covers and the first hub unsymmetrical, and thus, the characteristics in positive rotation is different from that in the negative rotation. Whereby, the torque can be absorbed effectively even in the idling driving.

BRIEF DESCRIPTION OF THE DRAWINGS

FIGS. 2, 3 and 4 are enlarged fragmentary sectional views taken along lines II—II, III—III and IV—IV, respectively; and FIG. 5 is a graph illustrating torsion damping characteristics.

DETAILED DESCRIPTION OF THE PREFERRED EMBODIMENTS

Figure 1:
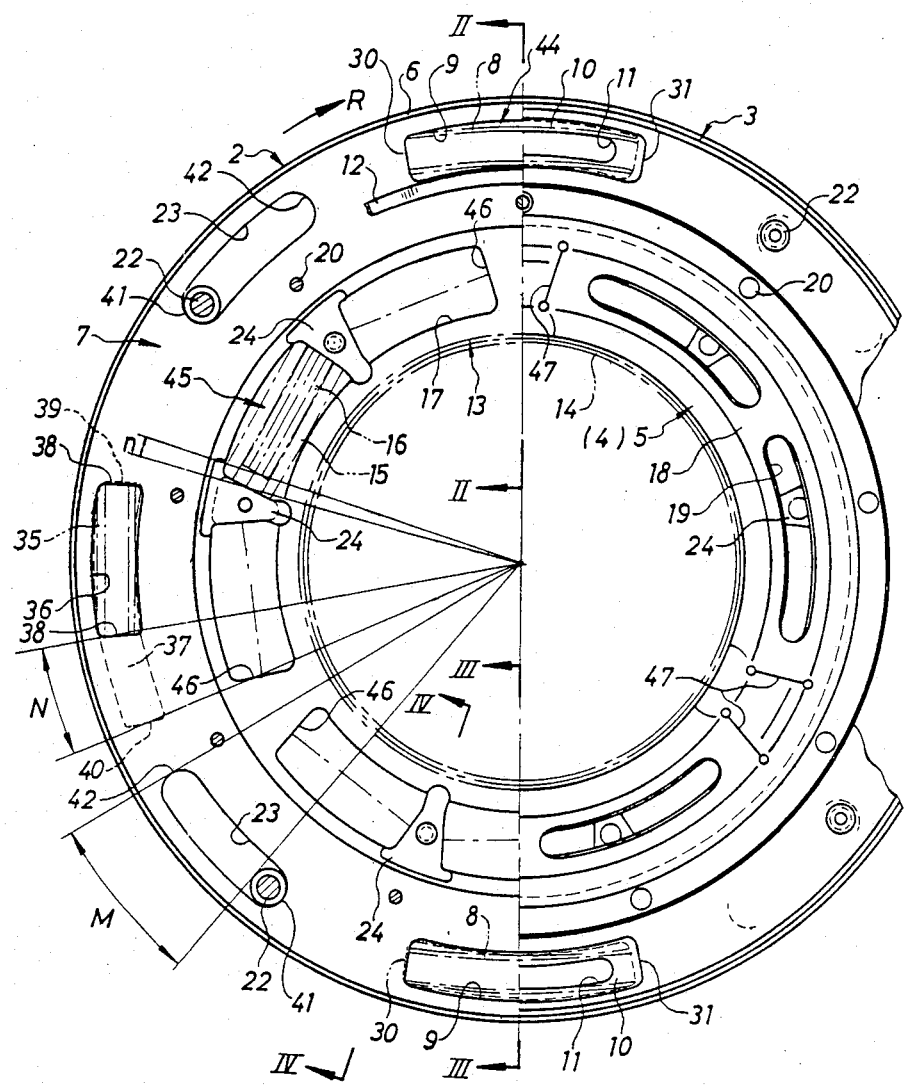
FIG. 1 is a schematic elevational view of a damper assembly of an embodiment according to the invention with certain parts cut-away.

Referring to FIG. 2, an annular cover assembly comprises a pair of first covers 2 and 3 at the radially outer side and a pair of second covers 4 and 5 at the radially inner side. An outer peripheral portion 6 of the cover 2 is of cylindrical form projected oppositely to the cover 3 and is connected to an input part (not shown) of a torque converter. An annular first hub 7 is disposed between the covers 2 and 3. The hub 7 is provided with openings 9 in which compressible coil springs 8 are arranged. The covers 2 and 3 are provided with curved portions 10 of arc-shaped sections which cover the outer peripheries of the springs 8. Openings 11 are formed in the curved portions 10. Annular friction member 12 such as a wave spring is interposed radially inside the springs 8 between the cover 3 and the hub 7.

The inner periphery of the hub 7 integrally continues to the outer periphery of the cover 4. An annular hub 13 is interposed between the covers 4 and 5. The hub 13 is provided at the inner periphery with spline 14, which is connected to an output shaft (not shown).

As shown in FIG. 3, the hub 13 is provided with openings 17 in which compressible coil springs 15 and 16 are arranged. The covers 4 and 5 are provided with curved portions 18 of arc-shaped sections for covering the outer peripheries of the spring 15. Openings 19 are formed in the curved portions 18. The springs 15 and 16 have large and small diameters, respectively, and are arranged concentrically. The outer peripheral portion of the cover 5 is bent radially outside the hub 13 toward the cover 4, and is fixed to the cover 4 by rivets 20.

As shown in FIG. 4, the covers 2 and 3 are connected together by stop pins 22, which extend through circumferentially long apertures 23 provided in the hub 7. Floating spacers 24 are also arranged in the openings 17 in the hub 13 as will be detailed later. Each spacer 24 consists of a center or core plate 25 and guide plates 26 fixed by rivets 27 to both surfaces of the core plate 25. The edges of the core plates 25 slidably contact the inner and outer edges of the openings 17. The guide plates 26 slidably holds both side surfaces of the inner and outer peripheral portions of the openings 17.

Referring to FIG. 1, said springs 8 are positioned at diametrally opposite two positions in the cover assembly 1, and extend in the circumferential direction of the disc. In the illustrated neutral position, i.e., non-torsion position, both ends of each spring 8 are supported by circumferentially both edges 30 of the openings 9 and both ends 31 (base ends) of the curved portions 10.

Two compressible coil springs 35 extending substantially in the circumferential direction of the disc are arranged at positions in the disc which are angularly spaced by 90 degrees to the springs 8, respectively. The springs 35 are arranged in openings 36 provided in the hub 7, and are covered by curved portions 37 of arc-shaped sections. In the illustrated neutral position, both ends of each spring 35 are supported by edges 38 of the openings 36. The springs 35 are in contact with front edges 39 of the curved portions 37 which are positioned at the front in a positive rotating direction R of the disc, and are apart from the rear edges 40 of the curved portions 37 with circumferential spaces N therebetween, respectively. The springs 35 and 8 form first torsion spring mechanism 44.

The apertures 23 for the stop pins 22 extend circumferentially long between the adjacent openings 9 and 36. In the illustrated initial position, each stop pin 22 is in contact with rear edge 41 of the long aperture 23 which is positioned at the rear in the rotating direction R, and is apart from the front edge 42 of the aperture 23 with a circumferentially long space M therebetween.

The damper includes three second torsion spring mechanisms 45 which consist of three sets of said springs 15 and 16 arranged in series and said spacers 24 interposed therebetween, respectively. In the illustrated initial position, both ends of each second spring mechanism 45 are supported by both edges 46 of the opening 17 and both ends 47 of the curved portion 18. In the initial position, the springs 16 are shorter by circumferential length n than the spring 15.

An operation is as follows.

A torque introduced to the covers 2 and 3 is transmitted through the first spring mechanisms 44 including the springs 8 and 35 to the hub 7, and then, is transmitted from the cover 4 (hub 7) and the cover 5 through the second torsion spring mechanisms 45 and the hub 13 to the output shaft. The springs 8, 15, 16 and 35 are compressed by a force corresponding to the transmitted torque, so that the covers 2 and 3 twist through an angle corresponding to those compressed length relatively to the hub 7, and the covers 4 and 5 twist through an angle corresponding to those compressed length relatively to the hub 13.

In the above operation in which the torsion torque increases in the positive rotating direction R, the strong springs 15 are rarely compressed in a first stage in which the torque is small. Further, since the torsion angle is also small when the torque is small, the rear ends 40 of the curved portions 37 do not contact the springs 35, and thus, the springs 35 are not compressed. Therefore, as indicated in a section O-A, a rate of increasing of a transmitted torque is small with respect to increasing of a torsion angle of the covers 2 and 3 relative to the hub 13.

When the torsion angle increases to a predetermined value of A1, the rear ends 40 contact the springs 35, and the springs 35 start to be compressed in a second stage. Therefore, as indicated by a section A-B in FIG. 5, the rate of increasing of the transmitted torque with respect to the increasing of the torsion angle becomes large.

When the torsion angle increases to a predetermined value of B1, the stop pins 22 contact the front edges 42 of the long apertures 22, and the springs 8 and 35 are not compressed in a third stage thereafter. At the point of the torsion angle of B1, the springs 15 are compressed through lengths corresponding to the spaces (n) respectively. Therefore, in the third stage, both of the strong springs 15 and 16 are compressed, and thus, as indicated at a section B-C in FIG. 5, the rate of increasing of the transmitted torque with respect to the increasing of the torsion angle becomes large, The torsion operation in the third stage terminates when the springs 15 are fully compressed. Since the three springs 15 are arranged in series, as described above, the covers 4 and 5 twist through a large angle with respect to the hub 13 until the springs 15 are fully compressed, and thus, a maximum torsion angle becomes large.

Contrarily, when the torsion torque increases in the negative rotating direction, the members and parts operate as follows. In the illustrated initial position, the stop pins 22 are in contact with the rear edges 41, Therefore, in the negative torsion operation, the covers 2 and 3 do not twist relatively to the hub 7, and only the covers 4 and 5 twist relatively to the hub 13. Therefore, in this negative operation, only the springs 15 and 16 are compressed, and thus, as indicated in a section 0-a-b, the rate of increasing of the transmitted torque with respect to the increasing of the torsion angle becomes large. Further, the springs 16 are not compressed in a first stage before the torsion angle increases to a predetermined value of a1, and are compressed in a second stage after the torsion angle increases to the value of a1. Therefore, the rate of increasing of the transmitted torque with respect to the torsion angle becomes large in the second stage a-b than that in the first stage 0-a.

When the torsion operation is performed as detailed above, friction occurs on the surface of the friction member 12 in FIG. 2 and others, which generates a hysteresis torque h in the damping characteristics, as shown in FIG. 5.

According to the invention, as detailed hereinbefore, the weak torsion spring mechanisms 44 are arranged between the covers 2 and 3 and the hub 7, and the strong torsion spring mechanisms 45, which include a plurality of the springs 15 and 16 connected in series, arranged between the hub 13 and the covers 4 and 5 connected to the hub 7. Therefore, the maximum torsion angle can be set large, and the torque vibration can be absorbed effectively through the whole torque areas from the small torque area to the large torque area. Further, since the stopper mechanism including the stop pins 22 and the long apertures 23 is employed to set the torsion or damping characteristics of the covers 2 and 3 and the hub 7 in the positive and negative directions unsymmetrically. For example, the weak torsion spring mechanisms 44 are designed to operate only at the torsion operation in the positive rotating direction. Therefore, the torque vibration and fluctuation can be absorbed effectively in the small torque area such as the idling driving. This effect by the unsymmetrical characteristics has been proved and recognized in tests.

Although the invention has been described in its preferred form with a certain degree of particularity, it is understood that the present disclosure of the preferred form may been changed in the details of construction and the combination and arrangement of parts may be resorted to without departing from the spirit and scope of the invention as hereinafter claimed.

What is claimed is:

1. A damper assembly comprising:
   an annular cover assembly including a pair of first covers positioned at the radially outer side of said assembly and adapted to be connected to a torque input part and a pair of second covers at the radially inner side of said assembly;
   an annular first hub connected to the second cover and disposed between the first covers;
   an annular second hub adapted to be connected to a torque output part and disposed between the second covers;
   a weak first torsion spring mechanism connecting the first covers to the first hub;
   a strong second spring mechanism connecting the second covers to the second hub;
   a stopper mechanism for preventing relative torsional displacement between the first covers and the first hub when a torsion angle between the first covers and the first hub increases to a predetermined value in the positive rotating direction and preventing essentially any torsional displacement between the first covers and the first hub in the negative rotating direction; and
   said second torsion spring mechanism includes a plurality of springs arranged in series with floating spacers therebetween.

2. The damper assembly as claimed in claim 1 wherein said stopper mechanism includes a stopper pin which is fixed to a pair of the first covers and extends through a circumferentially long aperture provided in the first hub, and said stopper pin is adapted to contact only one of the edges of the long aperture when the first covers and the first hub do not twist relatively to each other.

3. The damper assembly as claimed in claim 1 wherein said first hub is integrally formed with the second cover.

4. The damper assembly as claimed in claim 1 wherein a friction member for producing a hysteresis torque is interposed between the first cover and the first hub.

5. The damper assembly of claim 1 wherein the first spring mechanism includes first springs and second springs, the first springs engaging the pair of first covers and the first hub portion when torsional displacement in the positive rotational direction occurs, the second springs engaging the pair of first covers and the first hub portion when the torsional displacement in the positive rotational direction is equal to or exceeds the first predetermined torsion angle.

6. The damper assembly of claim 1 wherein the second spring mechanism includes a plurality of pairs of springs with floating spacers between adjacent pairs of springs; one spring of each pair being longer than the other spring of each pair, the longer springs of the second spring mechanism being compressed to a length corresponding to the length of the shorter springs of the second spring mechanism when the torsion angle reaches the predetermined value in the positive direction of rotation.

* * * * *